No. 762,794. PATENTED JUNE 14, 1904.
C. E. ZIEGLER.
TEA OR COFFEE PERCOLATOR.
APPLICATION FILED NOV. 12, 1903.
NO MODEL.

Witnesses
Charles E. Ziegler,
Inventor.
by
Attorneys

No. 762,794. Patented June 14, 1904.

UNITED STATES PATENT OFFICE.

CHARLES EDWARD ZIEGLER, OF PITTSBURG, PENNSYLVANIA.

TEA OR COFFEE PERCOLATOR.

SPECIFICATION forming part of Letters Patent No. 762,794, dated June 14, 1904.

Application filed November 12, 1903. Serial No. 180,920. (No model.)

*To all whom it may concern:*

Be it known that I, CHARLES EDWARD ZIEGLER, a citizen of the United States, residing at Pittsburg, in the county of Allegheny and State of Pennsylvania, have invented a new and useful Tea or Coffee Percolator, of which the following is a specification.

In preparing tea or coffee by the drip process it is desirable and, in fact, essential to the attainment of the best results that the tea or coffee should steep for a certain time in the boiling water and that after this initial steeping the water which is added should percolate slowly through and be drawn off from the leaves or grains, thus permitting the nutritious soluble portions of the latter to be thoroughly dissolved and carried off by the water.

My invention has for its object to produce a simple comparatively inexpensive percolator of compact form which in practice will efficiently perform its functions for the attainment of the above-mentioned objects.

To these ends the invention comprises the novel features of construction and combination of parts more fully hereinafter described.

Figure 1:
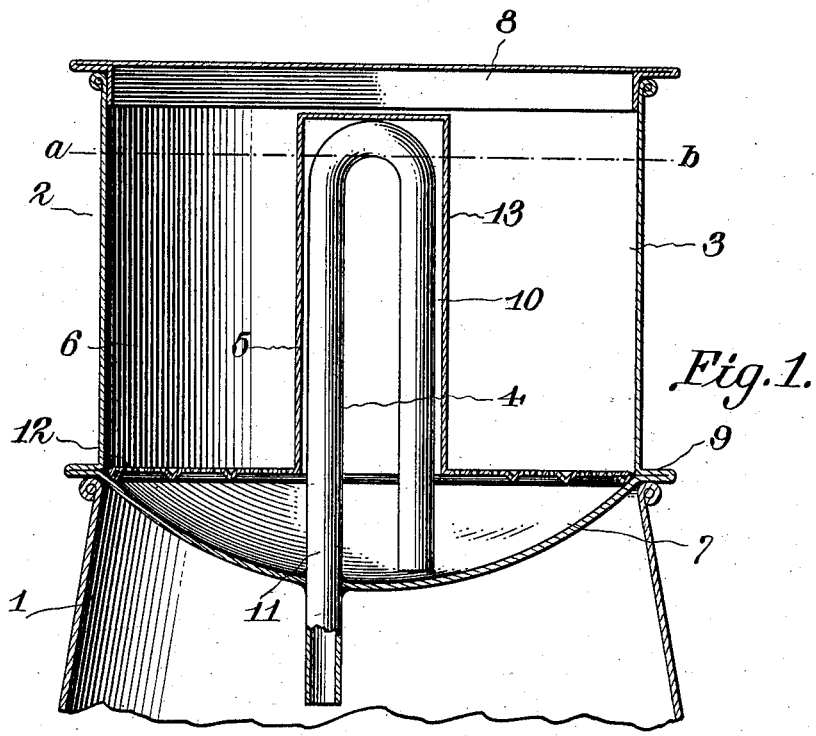
Figure 2:
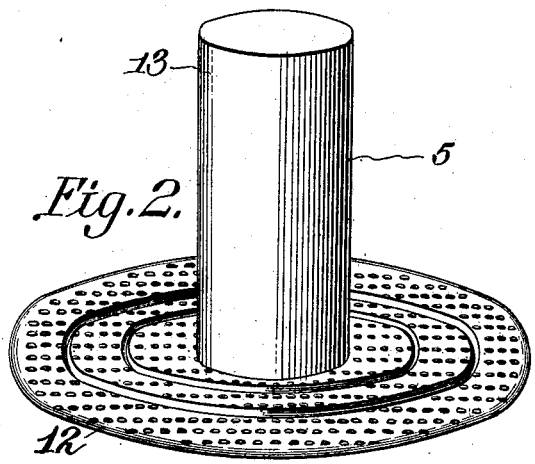

In the accompanying drawings, Figure 1 is a side sectional elevation of a portion of a coffee-pot having my improved percolator applied thereto. Fig. 2 is a perspective view of the cap or shield.

Referring to the drawings, 1 designates a tea or coffee pot of the usual or any preferred construction adapted to receive and sustain upon its upper open end my improved percolator 2.

The percolator, which is composed, preferably, of some suitable sheet metal, comprises a vessel or reservoir 3, a siphon 4, and a cap or shield 5, arranged over the siphon and dividing the reservoir into a tea or coffee receiving compartment 6 and an accumulating-chamber 7.

The vessel 3, the upper open end of which is normally closed by a lid or cover 8, has an outwardly or downwardly extending convex or dome-shaped bottom and is surrounded at the point of juncture of said bottom with its vertical side wall by a peripheral outwardly-extending horizontal flange 9, designed in practice to rest upon the top edge of the pot or other liquid-receiving vessel for supporting the percolator upon the latter.

The siphon 4 is of the usual construction and consists of a suitable length of pipe or tubing bent to substantially U form in side elevation and having a short arm 10, which terminates adjacent to the bottom of the vessel 3, and a long arm 11, which extends through and is attached in any suitable manner to said bottom, said arm 11 being intended in practice to extend downward into the underlying pot or vessel 1.

The cap or shield 5 comprises a disk-like base 12, composed of finely-perforated sheet metal or other suitable reticulated material, and an upstanding centrally-disposed tubular portion 13, composed of imperforate material. In practice when the shield 5 is seated in the vessel or reservoir 3 the peripheral edge of its base 12 rests and is supported at the juncture of the side wall and bottom of said reservoir, while the tubular portion 13 seats over and incloses the siphon 4, thus dividing the reservoir into the compartments 6 and chamber 7, as heretofore stated and as clearly illustrated in Fig. 1.

In operation the tea or coffee to be treated is placed in the compartment 6 and boiling water is poured thereover until the material is thoroughly covered, care being exercised, however, that the water shall not rise above the dotted line $ab$. After the leaves or grains have steeped the requisite time more water is poured into the reservoir, and as soon as the level of the liquid rises above the top of the siphon the action of the latter will be initiated, as usual and as is well understood. The first supply of water in which the material steeps and the water which is thereafter added percolates slowly through the material and accumulates in chamber 7, from which it is drawn by the siphon 4 and discharged into the underlying vessel or receiver 1. In this connection it is to be understood that by varying the size of the siphon-tube the speed of the latter in drawing off the liquid will be regulated, and thus the rapidity with which the water percolates through the material will be controlled.

It is to be particularly noted that the cap or shield is independent of and free from fixed connection with the siphon, whereby the cap, together with the material resting thereon, may after the latter has sufficiently steeped be lifted out of the reservoir without disturbing or affecting the siphon, which remains intact for drawing the residue of liquid from the reservoir and discharging it to the underlying vessel. Furthermore, owing to this arrangement of the parts the shield may in the event of the liquid falling below the level of the siphon and breaking the siphonage be actuated as a plunger for forcing the liquid up through the arm 10, and thus again starting the operation. In accomplishing this function the shield is partly withdrawn from the reservoir and then returned forcibly into the latter, as will be readily understood.

From the foregoing it is apparent that I produce a simple inexpensive device which in practice will admirably perform its functions for the attainment of the ends in view; but it is to be understood that I do not limit or confine myself to the precise details herein set forth, inasmuch as minor changes may be made therein without departing from the spirit of the invention.

Having thus described my invention, what I claim is—

1. A percolator comprising a vessel or reservoir, a siphon disposed therein, and a removable cap or shield seated in the vessel, said shield consisting of a tubular portion inclosing the siphon and a base dividing the reservoir into a receiving-compartment and an accumulating-chamber, said tubular portion of the shield being wholly independent of and free from fixed connection with the siphon.

2. A percolator comprising a vessel or reservoir, a siphon disposed therein, and a removable cap or shield seated in the vessel, said shield consisting of an imperforate tubular portion inclosing the siphon and a reticulated base dividing the reservoir into a receiving-compartment and an accumulating-chamber, said tubular portion of the shield being wholly independent of and free from fixed connection with the siphon.

In testimony that I claim the foregoing as my own I have hereto affixed my signature in the presence of two witnesses.

CHARLES EDWARD ZIEGLER.

Witnesses:
WILLIAM A. GRIFFITH,
ROBERT MORRISON.